United States Patent [19]

Wendt

[11] Patent Number: 5,151,233
[45] Date of Patent: Sep. 29, 1992

[54] APPARATUS AND METHOD FOR FORMING A PARTIBLE PORT IN A PRODUCTION PIECE

[76] Inventor: Michael L. Wendt, 1382 E. Hull Rd., Hope, Mich. 48628

[21] Appl. No.: 621,226

[22] Filed: Nov. 30, 1990

[51] Int. Cl.⁵ .............................................. B29C 43/02
[52] U.S. Cl. ................... 264/153; 264/322; 425/383
[58] Field of Search ............... 264/153, 293, 320, 322, 264/293, 153; 425/301, 302.1, 304, 383, 384, 385

[56] References Cited

U.S. PATENT DOCUMENTS

| | | | |
|---|---|---|---|
| 3,211,034 | 10/1965 | Andris | 83/685 |
| 3,524,566 | 8/1970 | Parks | 229/906.1 |
| 3,735,653 | 5/1973 | Powell | 83/695 |
| 3,945,528 | 3/1976 | Mowrey | 229/906.1 |
| 4,009,981 | 3/1977 | Rosen | 425/384 |
| 4,090,660 | 5/1978 | Schram et al. | 220/90.2 |
| 4,377,084 | 3/1983 | Kaminski | 83/617 |
| 4,518,096 | 5/1985 | Winstead | 229/906.1 |
| 5,025,947 | 6/1991 | Leone | 229/906.1 |

*Primary Examiner*—Willard Hoag
*Attorney, Agent, or Firm*—Timothy J. Martin; Dana S. Rewoldt

[57] ABSTRACT

Thermoforming apparatus and methodology is provided to form a breakaway port in a molded piece, such as a container lid. The apparatus includes a forging assembly that has a punch element and a striker assembly, so that a material blank that is heated to a plastic state by an oven may be advanced therebetween. When the thermoforming mold closes, a striker element and the punch element come together with a striking force so that a portion of the blank is forced against a male profile on the punch element to forge the port by forming lines of reduced thickness that are partible under mechanical force but which normally maintain the integrity of the molded piece against the passage of fluids. The striker element can be adjustably spring biased and can be mounted, for example, to the pressure box of the thermoforming mold while the punch element is positioned on the mold assembly that provides the mold configuration for the piece to be formed. When the thermoforming mold closes, the restorative force of the spring provides the striking force. The male profile is provided by ribs having a truncated triangular cross-section that provides the necessary geometry to create partible lines without severing the material of the production blank. The apparatus can perform a continuous cyclical process, and a trimming assembly can cut the molded pieces from a contnuous sheet of material advanced through the thermoforming mold.

38 Claims, 10 Drawing Sheets

APPARATUS AND METHOD FOR FORMING A PARTIBLE PORT IN A PRODUCTION PIECE

FIELD OF THE INVENTION

The present invention relates generally to thermoforming materials in a plastic state. More particularly, the present invention concerns thermoforming a plastic sheet of material into a plurality of production pieces where each production piece has a partible port section which has integrity against the passage of fluids therethrough yet which is partible under mechanical pressure so as to open and thereby allow passage of fluids. The present invention specifically concerns thermoforming plastic beverage container lids to include a partible port section through which a straw may be advanced.

BACKGROUND OF THE INVENTION

The formation of production pieces out of moldable materials has historically been one of humankinds basic fabricating technologies. Traditionally, these molding techniques included shaping, casting and forging processes. In a shaping process, a moldable material is shaped or sculpted, usually by hand, into a desired configuration, and the material is then cured in some manner, such as heating or drying. In a casting process, a material to be molded is forced into a die so that it takes a selected shape, and the material is allowed to cure until the material becomes sufficiently set to retain the shape of the mold element. On the other hand, in the forging process, a malleable material is mechanically forced over the shape of a mold element so that it takes on and retains the profile thereof. It is essential in the forging process that the material be malleable or capable of being placed in a malleable or "plastic state." Certain materials used in this process are placed in a malleable or plastic state by heating so that the forging process is accomplished as a thermoforming operation. Strictly speaking, in the forging process, a material is heated and is hammered or beat into shape.

Since the advent of the "plastics age" which uses various organic polymerized compounds as a production medium, the distinctions between casting and forging have become blurred due to the versatility of the organic polymer medium. With this medium, plastic materials, three types of thermoforming processes are prevalent. Once process, injection molding, may be likened to casting since injection molding is accomplished by forcing heated plastic material into a three dimensional mold element, and the production piece is released from the mold element when it has taken and can retain the shape of the mold. In another process, more akin to forging, a sheet of material that is heated to a plastic state is placed between male and female dies which close on the sheet to force a portion to take on the complementary profile of the male and female dies after which the dies open so that the formed production piece may be removed. Intermediate these two techniques are the various pressure controlled thermoforming processes such as vacuum/pressure thermoforming and blow molding. In the vacuum/pressure process, a sheet of material to be fabricated is forced to take on the profile of either a male mold element or a female mold element by applying a vacuum (or suction) to one side of the sheet and/or pressure to the opposite side of the sheet so that the pressure differential on the plastisized sheet causes the sheet to conform to the shape of the mold element without the need for a complimentary die. In blow molding, a three dimensional object is formed or "cast" out of a three dimensional production blank in the form of a closed tube or other production piece having an interior. The production piece is heated to a plastic state, inserted into a mold and pressure is applied to the interior of the piece thereby causing it to expand against the sides of a mold. Vacuum or suction may also be applied exteriorily of the production piece to enhance the molding operation.

The present invention has applications generally to the thermoforming technology. In its most general form, the present invention may be employed to form a partible port section in a production piece that has a suitable panel portion available to receive a partible port. Most dominantly, the present invention is utilized concurrently during the initial fabrication of the production price rather than subsequently. The present invention has especial application in the plastic lid industry wherein a container lid is fabricated out of a plastic material. These lids are adapted to snap-fit onto the rim of a container, such as a paper or plastic cup or glass, in order to help prevent spillage of fluids placed in the container. To this end, the lid has a perimeter having a lip structure configured to engage the rim of the container.

Often, when lids are provided for a beverage container, it is desirable to provide a port section so that a drinking straw may be inserted through the port section thus allowing access to the liquid contends therein. In some instances, a tear-away port structure is provided on the lid adjacent the perimeter thereof to provide a drink access opening for the mouth of the user. Where straw ports are provided, and as discussed more thoroughly in the detailed description of the present disclosure, a port is provided by transverse cuts which extend completely through the lid panel so that a plurality of triangular shaped flaps are cut with these flaps having a common vertex location. When a straw is inserted through the port, then, the flaps bend interiorly of the container so that the effective port size increases. A disadvantage of this structure is present, however, since the cuts are made completely through the lid; this severing of the lid violates the integrity of the lid in its ability to prohibit passage of fluid. Therefore, even before a straw is inserted through the port, liquid may be spilled out of the port section. Where tear-away port sections are provided, it has been found difficult to use these tear-away ports because, as a result of the fabrication techniques, it is difficult to control the thickness of the lid thereby resulting in inefficient tear-away lines.

Due to the disadvantages of the prior art techniques, a significant need has existed for a substantial period of time to develop apparatus and methodology to create a partible port section that remains completely sealed until mechanical force is applied to part the port section from the container lid, and there has been a need for such process having a high degree of control so that such port sections may be formed in high speed production operations with reliability. There has been a further need for apparatus capable of consistently creating such partible port sections in the panel of a thermoformed article. The present thermoform forging process and apparatus is directed to meeting these long felt needs.

SUMMARY OF THE INVENTION

It is an object of the present invention to provide an apparatus and method for forming a partible port section in a production piece having a suitable panel in which such port section may be formed.

Another object of the present invention is to provide a new and useful thermoform forging process for creating a breakaway port section, especially in a container lid used in the drink industry.

A further object of the present invention is to provide an apparatus and method for consistently forming a breakaway port section in a production piece wherein the port section maintains integrity against fluid transfer yet which may be readily partible under mechanical pressure to create an opening through which fluids may pass.

Still a further object of the present invention is to provide an apparatus and method for making a container lid having a partible port section for receiving a drinking instrument, such as a straw, when in use, yet which maintains the integrity of the lid against fluid transfer before being parted from the lid panel.

Yet another object of the present invention is to provide manufacturing apparatus and processing methodology which can be implemented to form a partible port section without requiring extensive modification to existing production machinery.

It is still another object of the present invention to provide production apparatus and process which reduces production steps by forming a partible port section contemporaneously with the fabrication of a production piece so as to eliminate a manufacturing step and accordingly provide a more efficient and less costly manufacturing.

According to the present invention, therefor, an apparatus is provided to thermoform a breakaway port section in the mold piece in the manner that the breakaway port section maintains the integrity of the piece against passage of fluids yet which is partible under mechanical pressure thereby to form a port that allows fluid transfer therethrough. In its general form, this apparatus includes an oven operative to heat the piece to a pre-selected elevated temperature so that the material forming the piece is placed in a plastic state. A punch element has a surface formed with male features defining a profile for the breakaway port section with these male features having a height above the punch surface that is less than the thickness of the portion of the mold piece wherein the port is to be fabricated. A striker assembly is associated with the punch element and has a strike head mounted so that the piece of material is located between the punch surface and the strike head. Finally, a strike force applying assembly is provided for relatively forcing the strike head and the punch element against a portion of the piece on opposite sides thereof so that the strike head and punch surface come together to squeeze the portion thereby forging the portion of the piece against the male feature with the punch element and thus forming the breakaway port section and the configuration of the male features.

In its preferred form, the apparatus according to this present invention simultaneously acts to mold a production piece out of a material blank and is especially adapted for forming beverage container lids with a breakaway straw port. In this more specific embodiment of this invention, the punch element and striker assembly are located within thermoforming apparatus which includes a mold assembly and a pressure box assembly which are relatively movable with respect to one another between a mold open position and the mold closed position. In the mold closed position, a mold chamber is created and pressure and/or vacuum sources are provided, with associated valving, so that a pressure differential may be applied on opposite sides of the material blank. Since the material blank is in a plastic state, this pressure differential will cause the material blank to conform to the shape of mold elements in the thermoforming apparatus. When the mold assembly closes, the punch element and the striker assembly move together to create the striking or forging force. To this end, one of the punch element and the striker element may be spring biased so that the force provided by the spring provides the forging force by being compressed against the advancement of the mold closing. The effective force applied by the spring may be adjusted by pre-compressing the spring to control the forging force.

Preferably, the male features on the punch surface are formed by one or more upstanding ribs, each of which having a triangular cross-section with the base contiguous with the punch surface and a pair of sides converging upwardly from the punch surface to define a height for the male features. The sides of the triangular shaped rib converge to a large acute angle, and this angle can be in the range of 80° to 90°. Further, each rib is truncated in an apex portion to form a flat apexial surface that may be substantially parallel to the punch surface and which has a width less than the height of the rib. The rib height in the most preferred embodiment of the present invention is approximately eighty percent (80%) of the thickness of the material panel and the width of the apexial surface is approximately sixty percent (60%) of the height of the rib. Where a single rib is used, it is configured in some geometrical shape so that the rib has opposite ends that are in closely spaced facing relationship to one another, such as a C-shaped configuration. Thus, the rib forges a breakaway line with the portion of the material between the ends providing a hinge for the breakaway port section. Where a plurality of ribs are used, they preferably may be linear ribs which intersect at a common center so that the breakaway port section is formed by a plurality of triangular panels.

The method of thermoforming a sheet of material according to the present invention, therefore, includes the steps of heating the material into a plastic state and then positioning the material between a punch element on side thereof and a strike surface on another side thereof wherein the punch element has male features configured in the shape of the breakaway port section and wherein the male features have a height that is less than the thickness of the sheet of material. Next, a portion of the material between the punch element and the strike surface is squeezed by relative movement of the punch element and the strike surface to forge the material around the male features thereby to form lines of reduced thickness. The material is then allowed to cool so that, thereafter, the lines of reduced thickness form breakaway lines that are partible under mechanical force exerted on the forged breakaway port section.

Preferably, the method of the present invention is used to fabricate a container lid for a beverage container and includes the step of molding a lid edge receiving structure around the breakaway port section concurrently with the step of squeezing a portion of the material between the punch element and strike surface. This method includes the step of trimming the container lid from a sheet of material after allowing the material to cool. The step of squeezing the portion of material is preferably accomplished by advancing the strike surface towards the punch element, and this may be accomplished by providing a strike element that has a strike head containing the strike surface and including the step of resiliently biasing the strike head with the biasing force directed towards the punch element whereby the step of advancing the strike surface toward the punch element causes the strike head to first contact the portion of the material to be forged and wherein the step of squeezing the portion of material is accomplished by the biasing force upon further advancement of the strike head toward the punch element.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to thermoforming apparatus and methodologies which are adapted to form a breakaway port section in a production piece that is constructed out of a material which becomes plastic in an elevated temperature state. Thus, the concepts of this invention in home industry may be used to form a breakaway port section in a mold piece after it has already been formed but, more preferably, it is incorporated into a thermoforming mold so that the breakaway port section is formed simultaneously with the formation of the mold or production piece. This reduces production costs both from an operative standpoint and from a capitol equipment standpoint. The present invention can be implemented both in the original thermoforming equipment and also as a retrofit structure for existing thermoforming machinery without the need for undue modification thereof.

While it is not the intent of this disclosure to in any way limit the type of production piece into which a breakaway port section is formed, an exemplary technology which is especially suited for use of the present apparatus and methodology is that thermoforming technology used to fabricate container lids such as used with beverage containers. Thus, this disclosure shall describe the apparatus according to the fabrication of container lids for purposes of illustration.

Figure 1:
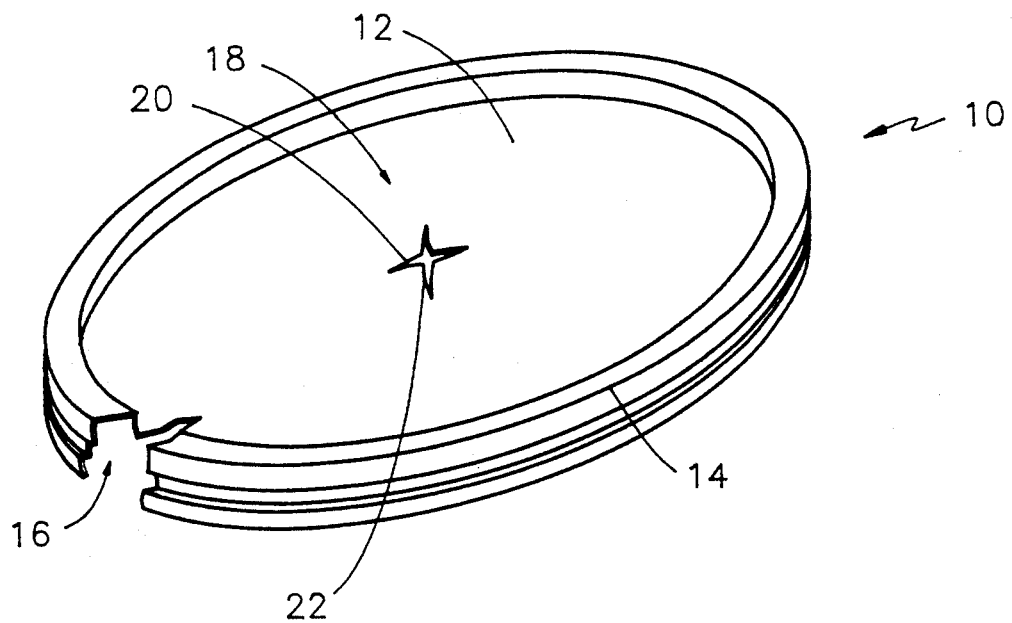
FIG. 1 is a perspective view of a container lid according to the prior art.

In order to best appreciate the differences between the apparatus and methodology of this invention, it is first helpful to understand the apparatus and methodology used to fabricate existing beverage container lids. An example of such a container lid is therefore shown in FIG. 1 where it may be seen that the prior art container lid 10 has a central panel 12 which is surrounded by a peripheral lip 14 that forms an edge for lid 10. Peripheral lip 14 has an inverted U-shaped structure to provide an inverted channel 16 sized to receive the rim of a container to be covered by lid 10, such as a beverage drinking container. An access port 18 is formed in central panel 12 by a pair of intersecting slits 20 and 22 which form a plurality of triangular tabs which are severed from one another so that a straw may be inserted through access port 18. This structure is well known, but it should be understood that, in the prior art, slits 20 and 22 completely sever the thickness of the panel 12 so that the sealing integrity of the panel is violated, that is, fluids may leak out of port 18 even when lid 10 is mounted on the container.

Figure 3A:
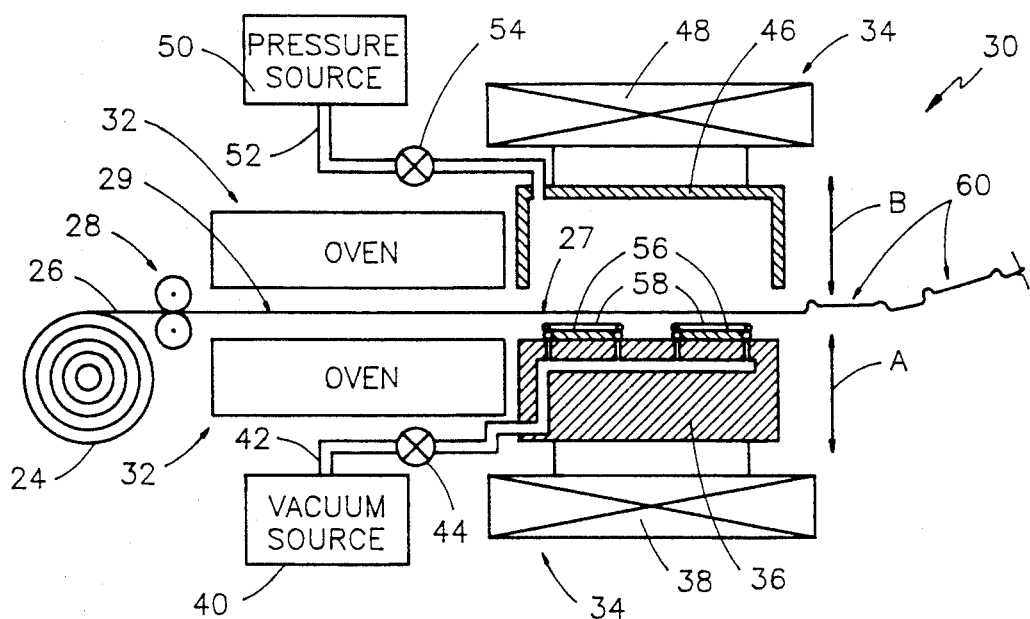
FIGS. 3(a) and 3(b) are diagrammatic side views in elevation respectively showing the prior art thermoforming assembly and lid trimming/slot forming apparatus for fabricating production pieces in the form of beverage container lids such as shown in FIG. 1.
Figure 10:
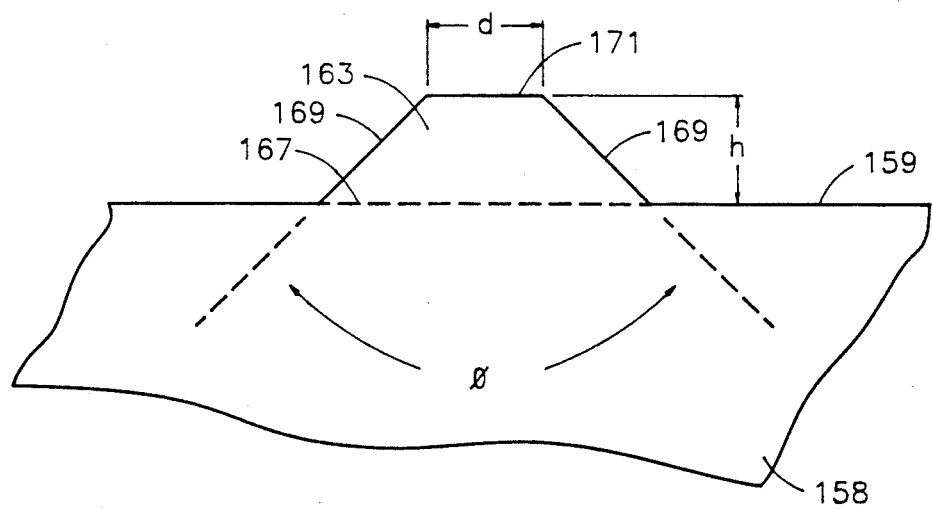
FIG. 10 is a cross sectional view taken about lines 10—10 of FIG. 9.

The fabrication apparatus for the prior art lid shown in FIG. 10 is best shown in FIGS. 3(a), 3(b), 4(a) and 4(b). In FIG. 3(a), it may be seen that a stock of material may be provided by roll stock 24 which allows advancement of continuous sheet 26 of material through a thermoforming assembly 30. This advancement may be accomplished, for example, by means of counteracting roller assembly 28. The material forming sheet 26 is a material which may be placed in a plastic state at an elevated temperature and, naturally, includes normal thermoforming plastic materials such as polystyrenes, polyethylene teraphthalate (PET) or other organic polymers. Accordingly, sheet 26 is first advanced through an oven assembly 32 to heat the material to an elevated temperature after which it moves into a thermoforming apparatus 34.

Thermoforming mold 34 includes a mold assembly 36 mounted on suitable supports 38 and connected to a vacuum source 40 by means of a conduit 42 and a valve 44. Opposite mold assembly 36 is a pressure box assembly 46 mounted by suitable supports 48 and connected to a pressure source 50 by means of a conduit 52 and valve 54. Mold assembly 36 includes one or more mold elements, such as mold elements 56 each of which having an upstanding rib structure 58 operative to form peripheral lip 14 as a matrix in sheet 26 as shown by formed production pieces 60. To this end, mold assembly 36 and pressure box assembly 46 are relatively movable with respect to one another in the direction of arrows A and B, respectively to form a pressure box chamber in a closed state. When closed, pressure is applied to side 27 of sheet 26 by opening valve 54 while suction or vacuum is applied to side 29 of sheet 26 by opening a valve 44. Thus, sheet 26 is forced, by the pressure differential, to take the configuration of mold elements 56.

Figure 3B:
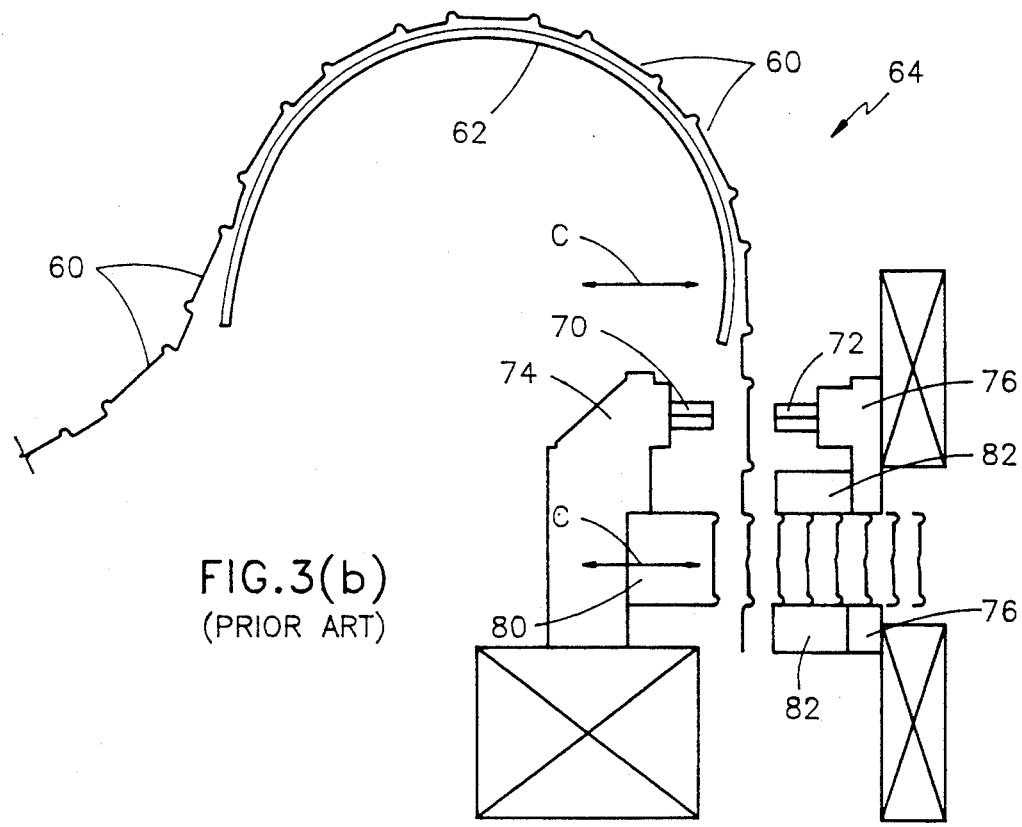
Figure 4A:
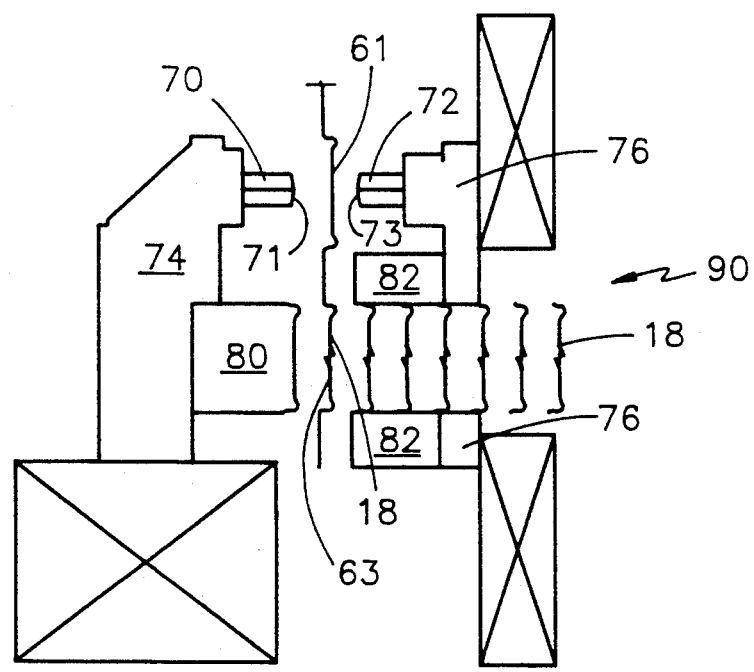
FIGS. 4(a) and 4(b) are enlarged diagrammatic views of the lid trimming/slot forming apparatus according to the prior art used to cut the lids of FIG. 1 with FIG. 4(a) being in the open position and FIG. 4(b) being in the closed or cutting position.
Figure 4B:
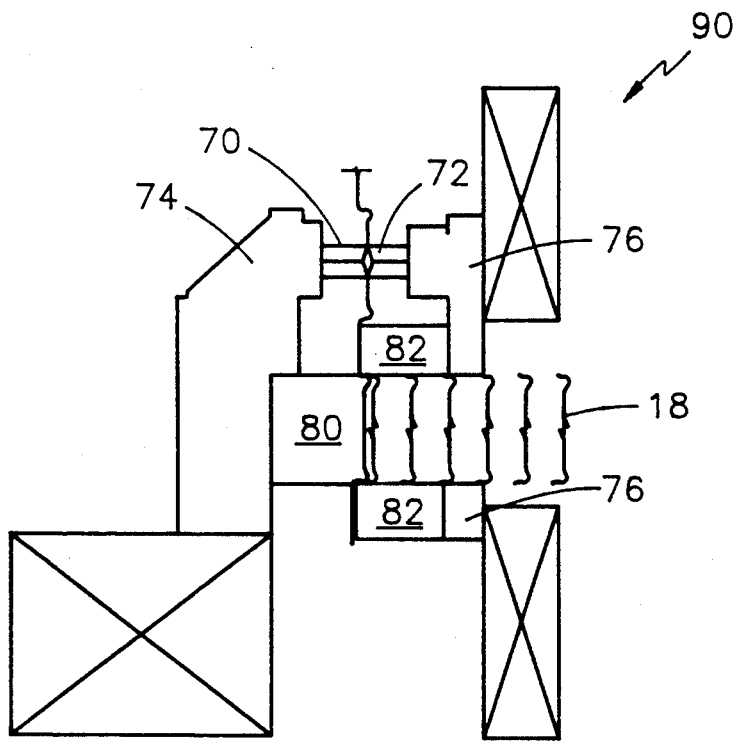

After pieces 60 are molded, they are advanced over a guide hood 62 and into a lid trimming/slot cutting assembly 64 best shown in FIG. 3(b), 4(a) and 4(b). Cutter assembly 64 includes a pre-punch assembly including first and second punch elements 70 and 72 mounted by suitable supports 74 and 76, respectively and a cutter assembly including first and second knife elements 80 and 82 which are mounted, respectively, to supports 74 and 76. Supports 74 and 76 are relatively movable toward and away from one another, as shown by arrow C between an open position shown in FIG. 4(a) and a closed position shown in FIG. 4(b). When punch elements 70 and 72 close, punch surfaces 71 and 73 act to cut slits 20 and 22 in lid 61. Simultaneously, an adjacent lid 63 containing a slitted port section 18 is cut from the sheet of material by means of knives 80, 82. To this end, it may be seen that knife 80 is provided with a lid edge profile so as not to damage the lid edge structure when the cutting operation is performed. Completed lids 90 each containing a port 18 are then ejected from the apparatus.

Figure 5:
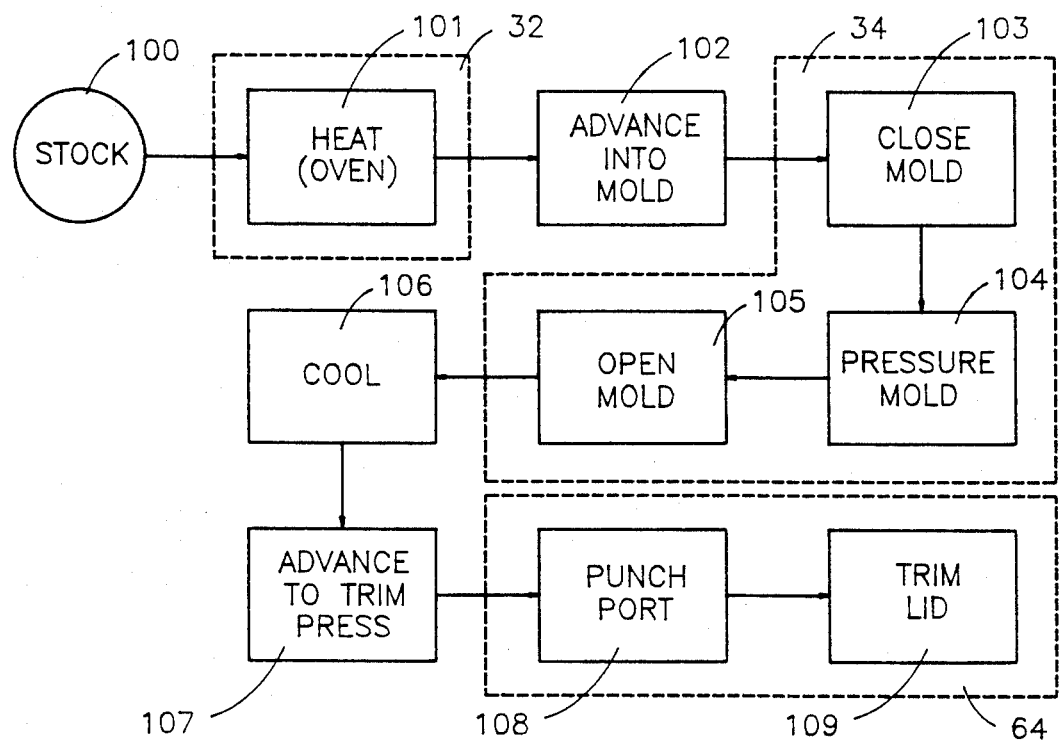
FIG. 5 is a block diagram showing the fabricating methodology according to the prior art assemblies shown in FIGS. 3(a), 3(b), 4(a) and 4(b) to fabricate prior art production piece lids according to FIG. 1.

The method according to the prior art apparatus, then, is diagrammed in FIG. 5. Here, it may be seen that a sheet of material is advanced from stock location 100, which may be, for example, a roll of material 24, into a heating step at 101. From there, the material is advanced, at 102, into a mold after which the mold closes at 103, is pressurized at 104 to mold a production piece, and the mold is opened at 105. After the mold is open, the piece is cooled at 106, and advanced to a trim press at 107. In the trim press, the port is punched at 108 and a resulting production piece or lid is trimmed at 109. It should be understood that the heating step 101 may be accomplished by oven 32 as is shown by the dotted line surrounding step 101. Similarly, thermoforming apparatus 34, shown as a dotted line in FIG. 5, accomplishes the steps of closing the mold pressurizing and opening the mold shown as steps 103-105. The punching of the port at 108 and the trimming of the lid at 109 is accomplished by lid trimming/slot forming assembly 64.

Figure 2:
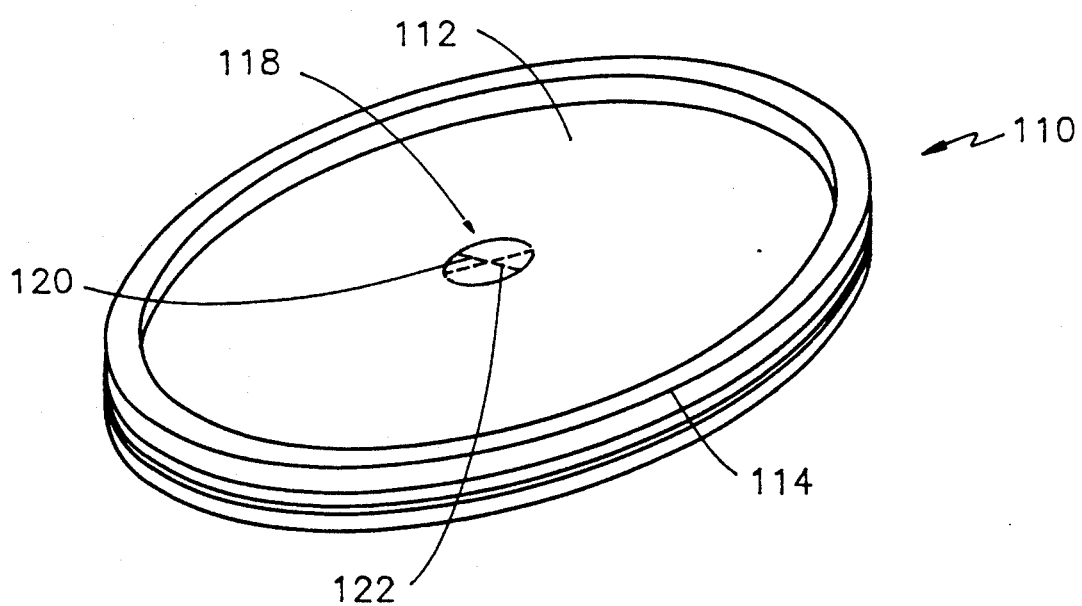
FIG. 2 is a perspective view similar to FIG. 1 but showing a container lid as an exemplary production piece formed according to the apparatus and method of the present invention.

Turning again to FIG. 2, it may be seen that the improved lid 110 according to the present invention is similar to lid 10 by having a central panel 112 surrounded by a peripheral lip 114 which is the same as lip 14. However, instead of utilizing slits completely through panel 112 to form a breakaway port section 18, the present invention uses a forgoing process to provide breakaway lines of reduced thickness for a portible port section 118 as shown by phantom lines 120 and 122 in FIG. 2. It should be understood that these lines of reduced thickness are not cut completely through panel 112 so that breakaway port section 118 maintains it integrity against the passage of fluids until it is parted by a mechanical pressure such as breaking port 118 by a straw, some other implement, or the fingers.

Figure 6A:
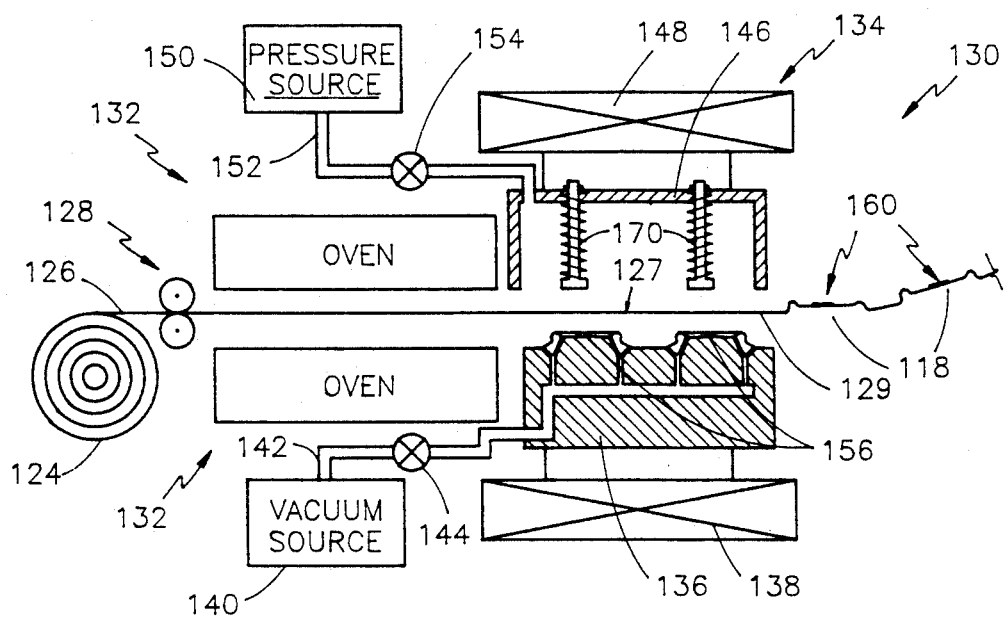
FIGS. 6(a) and 6(b) are diagrammatic side views in elevation showing a thermoforming apparatus and a lid trimming assembly of the exemplary embodiment of the present invention incorporating the improved methodology of this invention.
Figure 6B:
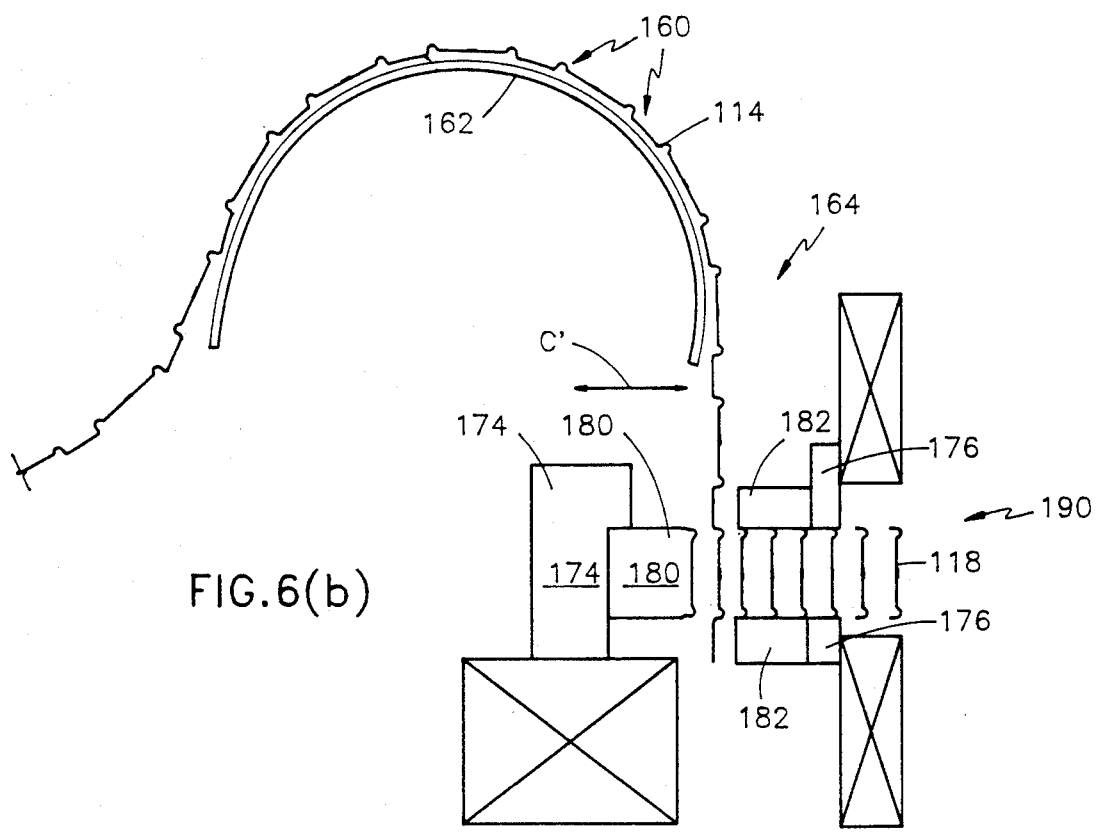

The apparatus to construct this improved lid 110 is generally shown in FIG. 6(a) and 6(b) where it may be seen that the material to be fabricated is provided in the form of stock roll 124 off of which a sheet 126 is advanced by means of rollers 128 and into a thermoforming apparatus 130. Sheet 126 first passes through an oven 132 where it is heated to a plastic state and then advanced into a thermoforming mold 134. Thermoforming mold 134 has a mold assembly 136 mounted on a support 138 and a pressure box assembly 146 mounted on support 148.

Sheet 126 has an upper side 127 facing pressure box 146 and a lower side 129 facing mold 136. Mold 136 is provided with a pair of male mold elements 156 described more thoroughly below with reference to FIGS. 7(a) and 7(b) and pressure box 146 is provided with a striker assembly including a pair of striker elements 170 also described in greater detail in FIGS. 7(a) and 7(b). It should be appreciated that more than two pairs of male mold elements and complimentary striker elements may be provided within size and design constraints of thermoforming apparatus. In any event, pressure box assembly 146 is connected by a conduit 152 to a pressure source 150 through a valve 154. Likewise, mold assembly 136 is connected to a vacuum source 140 by means of a conduit 142 and a valve 144.

Thermoforming apparatus 130 operates to form a web of production pieces 160, each including a breakaway port section 118, in sheet 126. This sheet is advanced, as is shown in FIG. 6(b), over a hood 162 so that formed lids 160 become cooled. They are then advanced into a trim assembly 164 which includes a first blade section 180 mounted by a support 174 and second blade 182 mounted by support 176. Blades 180 and 182 are relatively movable with respect to one another in the direction of the arrow C' so that blade 180 moves into a cavity formed by blades 182 to sever each individual lid 190 from the sheet of material. Again, blades 180 and 182 have profiles that match each peripheral lip 114 of lid 160 so as to avoid destroying the integrity thereof. It should be noted at this point that the pre-punch assembly described with respect to FIG. 3(b) is entirely eliminated from the improved apparatus since the breakaway port section is formed by a forging process occuring in thermoforming apparatus 130. Further, it should be understood that the trimming assembly 164, as is existing punch/cutting assembly 64, is an existing structure as is known to the ordinarily skilled person in this field of invention.

Figure 7A:
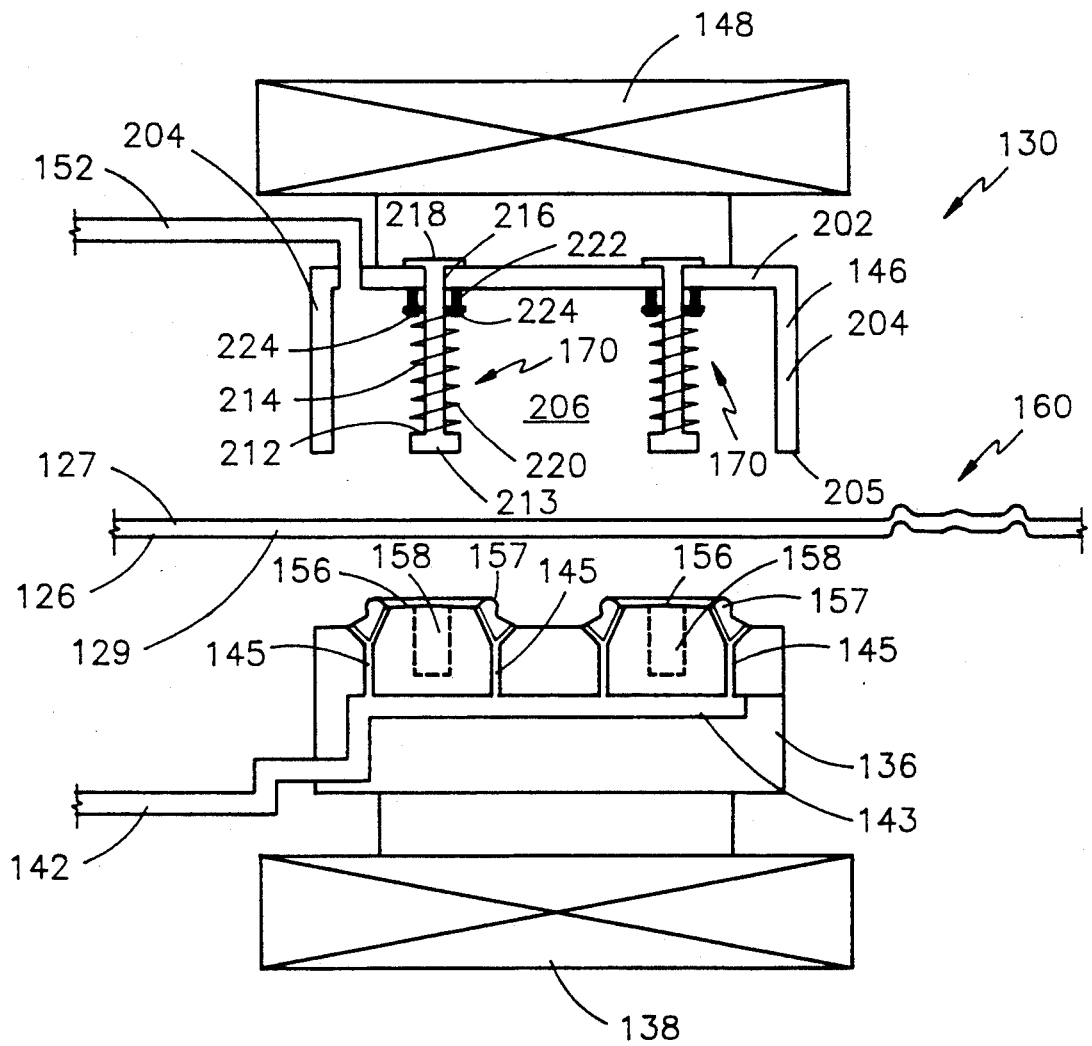
FIGS. 7(a) and 7(b) are enlarged diagrammatic side views in elevation showing the thermoforming mold according to the exemplary embodiment of the present invention with FIG. 7(a) being in a mold open position and FIG. 7(b) being in a mold closed position.

With greater particularity, as is shown in FIG. 7(a), it may be seen that mold assembly 136 and pressure box assembly 146 are in a mold open position with material sheet 126 being positioned between these two assemblies. Mold assembly 136 has a pair of mold elements 156 including upstanding male profile ridge 157 which is of the shape of the production piece to be formed. A punch element 158 is inset within the perimeter of each ridge 157 and, in this embodiment, is centrally located therein. Vacuum conduit 142 is in fluid communication with vacuum manifold 143 which in turn has a plurality of passageways 145 which communicate through the surface of mold assembly 136, as is known in the art. It should be understood that the significant difference between mold assembly 136 and mold assembly 36 is the inclusion of inset punch elements 158.

Pressure box assembly 146 includes a base plate 202 and a surrounding sidewall 204 to define a cavity 206 therein. Cavity 206 is in fluid communication with pressure conduit 152. As noted above, a pair of striker assemblies 170 are associated with the pressure box. Each striker assembly 170 includes a striker head 212 having a striker surface 213. Striker head 212 downwardly depends from an elongated shaft 214 which is slideably journeled through a bore 216 in base plate 202. A disc shaped stop 218 is mounted on the end of shaft 214 opposite head 212, and a biasing spring 220 extends around shaft 214 between head 212 and brace 222, which is provided with a hole for shaft 214. Accordingly, spring 220 biases strike head 212 toward respective punch element 158 under the biasing force of spring 220. This force may be adjusted by varying the position of brace 222 by means of threaded adjustment screws 224. The entire length of strike assembly 170, resulting from the length of shaft 214 and the size of head 212, is selected to be slightly greater than the distance sidewall 204 depends from base 212. Again, more than two pairs of punch elements and striker assembly may be provided in the thermoforming apparatus.

Figure 7B:
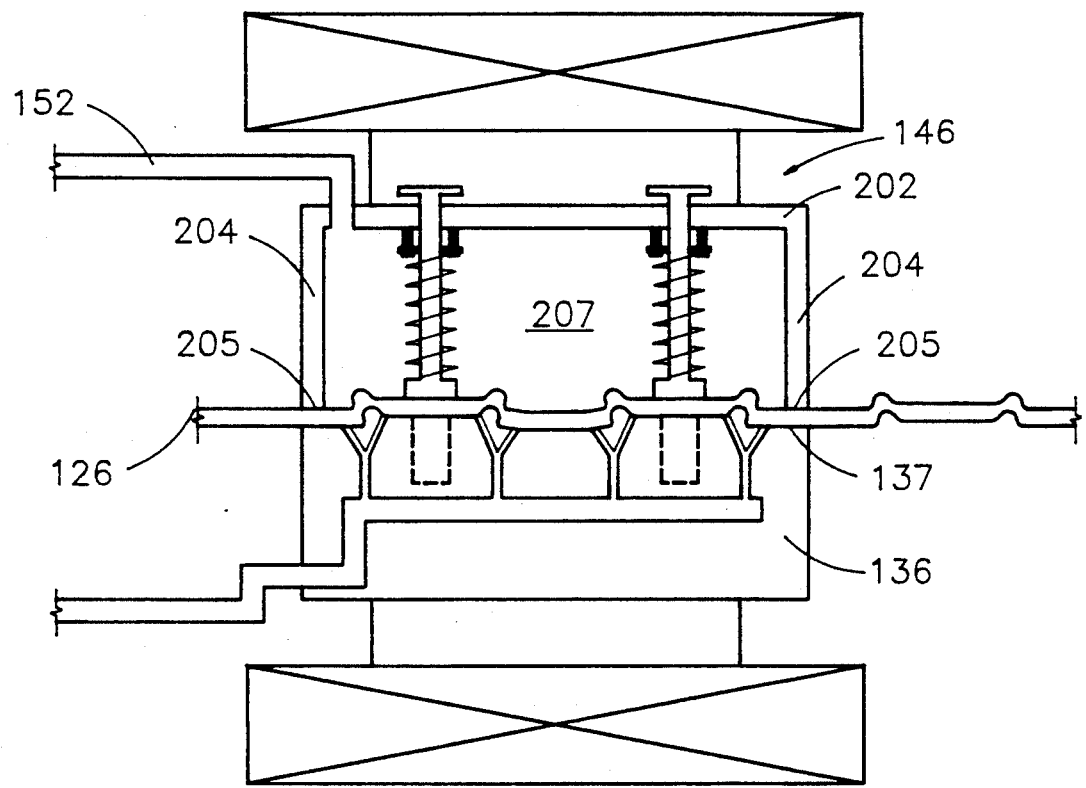

Operation of the present apparatus in the mold closed position is best shown in FIG. 7(b). Here, it may be seen that, in the mold closed position, pressure box lower edge 205 of sidewall 204 of pressure box assembly 146 advances towards upper surface 137 of mold assembly 136 so that cavity 206 and mold element 136 form a pressure chamber 207 by establishing a relative seal against each other with sheet 126 trapped therebetween. Valves 154 and 144 are opened when the thermoforming mold is in the mold closed position so that chamber 207 is pressurized on a side of sheet 126 that faces pressure box 146 and a reduced pressure is applied through manifold 143 and passageways 145 on the side of sheet 126 facing mold 136. This differential in pressure causes sheet 126 to be configured into the surrounding lip structures 114 as a result of ridges 157.

When pressure box 146 and mold assembly 136 have moved toward and reached the mold closed position shown in FIG. 7(b), it should be understood that strike head 212 and, specifically, strike surface 213 attacks sheet 126 at a portion thereof so that the portion is trapped between strike head 172 and a respective punch element 158. The strike force provided by biasing spring 220 thus presses the portion of sheet 126 located between strike head 212 and punch element 158 to configure the partible port section.

Figure 8A:
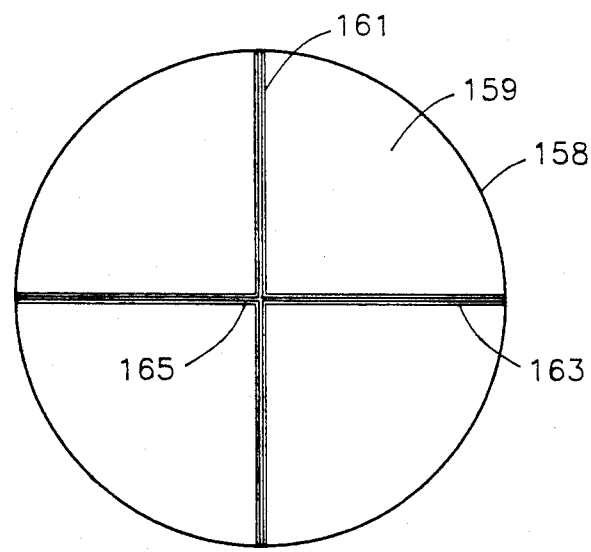
FIGS. 8(a)-(c) are top plan views showing three alternate embodiments of male features on the punch surface of a punch element according to the present invention.
Figure 8B:
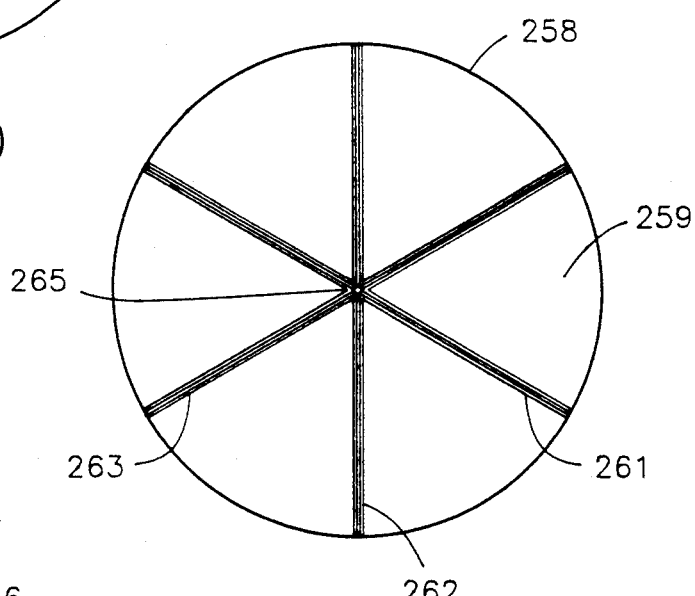
Figure 8C:
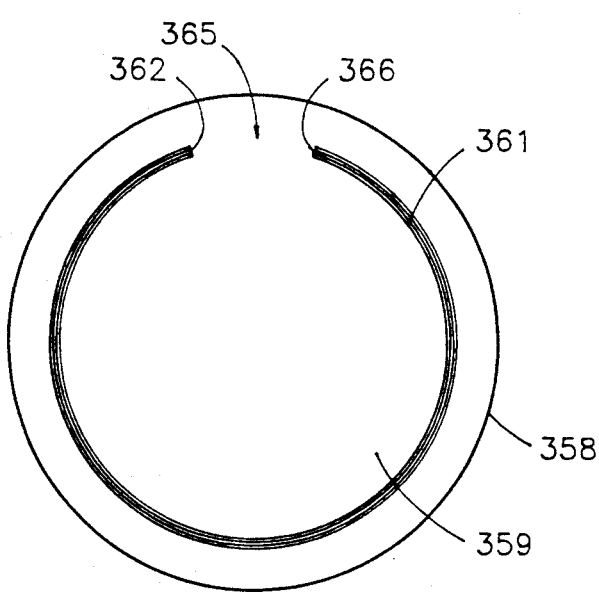
Figure 9:
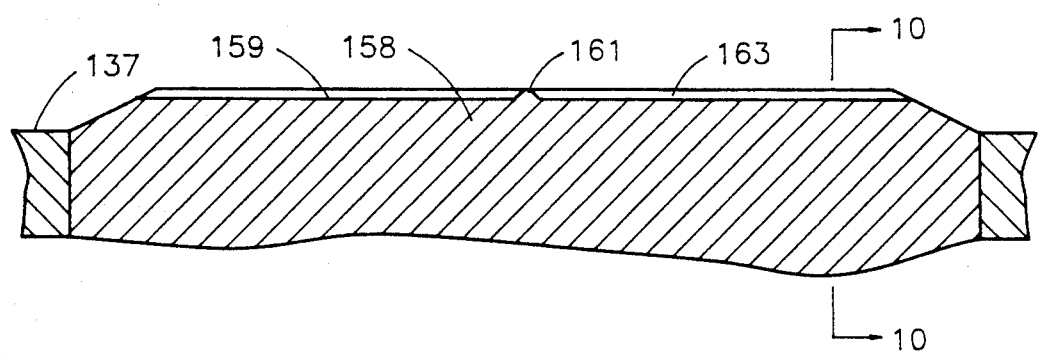
FIG. 9 is a side view in cross-section of the mold element of FIG. 8(a) shown inserted into the mold assembly of FIGS. 7(a) and 7(b)

More particularly, the formation of the partible port section is shown in FIGS. 9-11 for use with various ones of the die surfaces shown in FIGS. 8(a)-8(c), or any other selected port section punch profile selected by the user. Turning to FIGS. 8(a)-8(c), it may be seen that alternate punch elements 158, 258, 358 are provided. Punch element 158 has a punch surface 159 that is provided with a pair of linear ribs 161 and 163 which intersect one another at a common intersection 165. In FIG. 8(b) punch element 258 has a punch surface 259 which is provided with three linear ribs 261, 262 and 263 which interact at a common center 265. Finally, punch element 358, in FIG. 8(c) is provided with a single C-shaped rib 361 on its surface 359 with the ends 362 and 363 of rib 361 being in facing relationship at location 365.

Each of punch elements 158, 258 and 358 are configured to operate in conjunction with strike head 212 so as to form breakaway lines of reduced thickness forming a partible port section for each lid structure 160. By way of example, punch element 158 is shown in greater detail in FIG. 9 where it may be seen that punch surface 159 is elevated slightly above mold surface 137 with ribs 161 and 163 each having a truncated triangular shape. The truncated triangular shape is best shown in FIG. 10 which is an enlarged cross-section of rib 163 where it may be seen that rib 163 has a base, shown as phantom line 167 and a pair of sides 169 which are oriented at a large acute angle with respect to one another. Preferably, sides 169 are oriented at an angle of between 80° and 90°, inclusively. Rib 163 is truncated at height H to provide a flat apexial surface 171 which is parallel to base 170 that is also contiguous with the punch surface 159. Apexial surface 171 has a width "d". In the preferred embodiment of the present invention, the height "h" is necessarily less than the thickness of a panel sheet 126 to be formed thereby, otherwise rather than forming a breakaway line segment, a slit would be cut completely through the material sheet by each rib, such as rib 163. Accordingly, the rib height is approximately 80% of the thickness of the sheet into which the breakaway port is to be fabricated, and the width of apexial surface 171 is selected to be about 50%-75% of the height "h" of each rib. Thus, where plastic sheet 126 is approximately 0.010", the height of "h" of each rib is selected to be approximately 0.008" while the width "d" of each apexial surface, such as surface 171, is selected to be approximately 0.005".

Figure 11A:
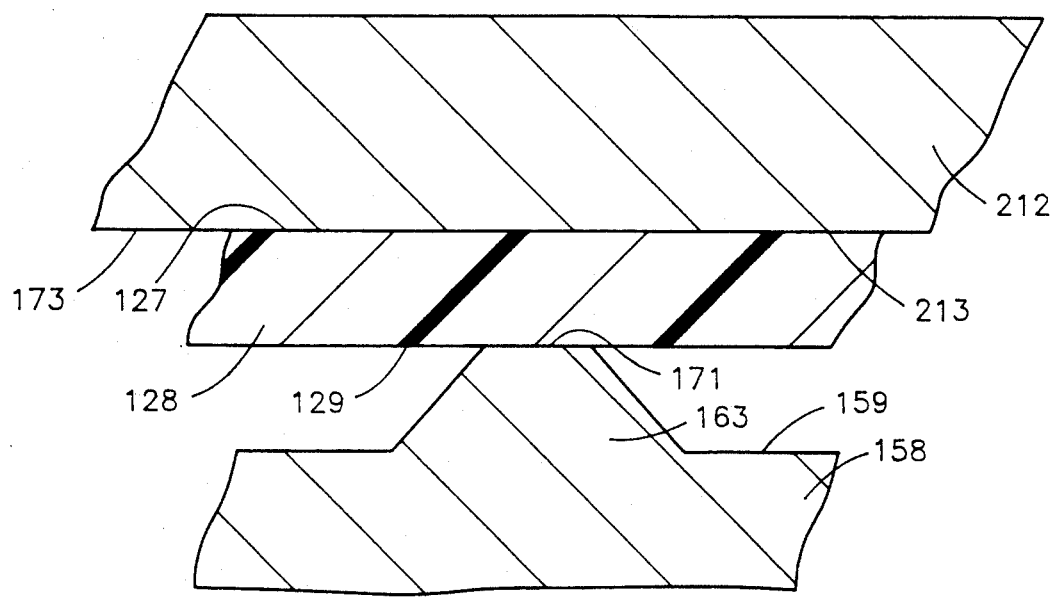
FIGS. 11(a) and 11(b) are enlarged views showing the forging of a production piece around a male profile rib element of FIGS. 8(a)-8(c)
Figure 11B:
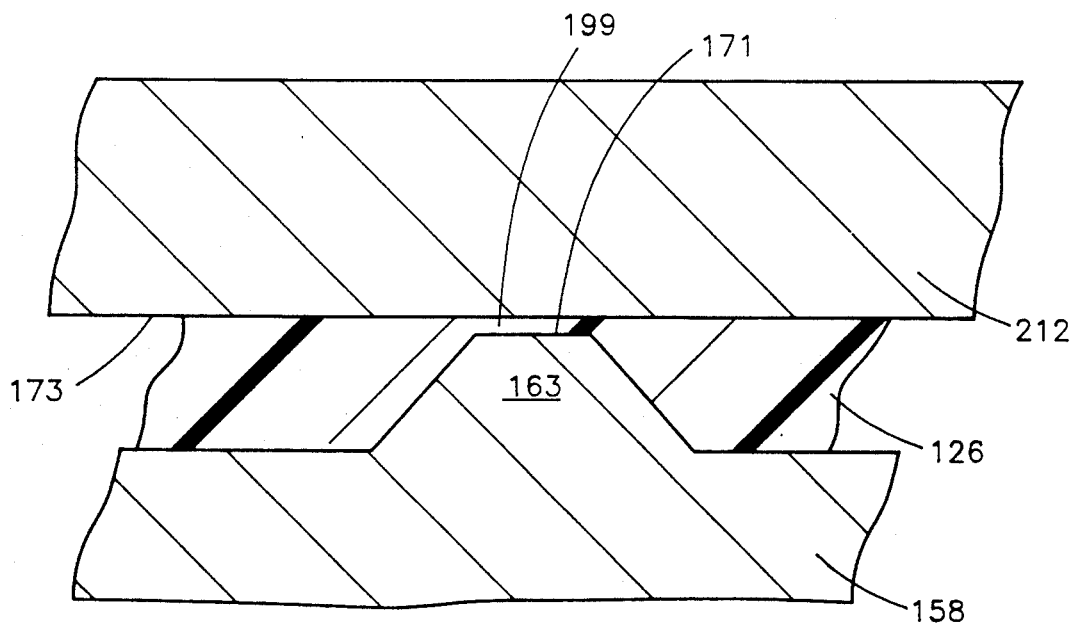

The formation of a partible line is best shown in FIGS. 11(a) and 11(b). In FIG. 11(a), it may be seen that strike head 212 and punch element 158 form a forging assembly so that, as strike surface 213 is advanced, it contacts surface 127 of sheet 126 to force surface 129 against the ribs, such as rib 163 on punch element 158. Specifically, contact is made by apexial surface 171. Continued advancement of strike head 212 is shown in FIG. 11(b) and it may be seen that sheet 126 is thereby pressed against and formed around rib 163 so that a breakaway line portion 199 is formed proximate apexial surface 171.

Severance in the region of apexial surface 171 is presented by the geometry of the strike surface 173 and apexial surface 171 along with punch surface 159. Referring again to FIG. 11(a), it may be seen that for a hundred pound force exerted by strike head 212 and where the total length of the ribs on the respective punch element is 1", the relative force on apexial surface 171 is approximately 20,000 lbs. per square 1". (100 lbs./(1"×0.005")). However, after the plastic material of sheet 126 close around the ribs, the relative force on the punch face drops by a factor of about 40. Again, where the relative force of the striker head is 100 lbs., the effective force on punch element 158 is approximately 509 lbs. per square inch (100 lbs./(3.14×0.25"×0.25")), where the punch element has a diameter of approximately 0.5". This reduction in relative force of approximately 40 to 1 is more than enough to halt the advance of the striker plate.

Figure 12:
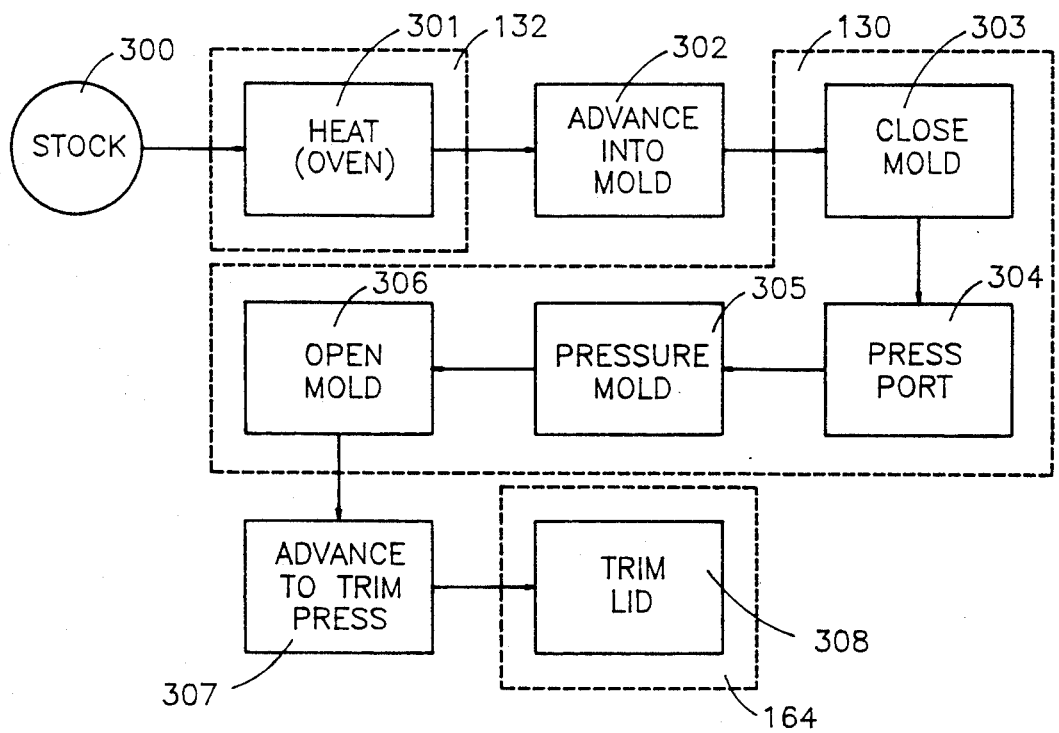
FIG. 12 is a block diagram showing the processing steps according to the broad exemplary form of the methodology of the present invention.

From the foregoing, it should be appreciated that the method according to the preferred embodiment of the present invention may be diagrammed in FIG. 12. Here again, stock is advanced from stock roll 300 into a heating step 301 which is accomplished by oven 132. Next, it is advanced, at 302, into the mold assembly of thermoforming apparatus 130 and the mold is closed at 303. As the mold closes, the breakaway port section is forged at 304 while the article of manufacture is pressure molded at step 305. The mold is then opened at 306. It should be understood that the port forging step 304 and the pressure molding step 305 may occur simultaneously. Alternately, the port can be formed either before or after the article is actually molded. After the mold is opened, the article is advanced to a trim press, at 307 and the lid is trimmed at 308 by means of trimming apparatus 164.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A method of thermoforming a sheet of material having a first thickness into a production piece having a breakaway port section
including the steps of:
heating said material into a plastic state;
positioning said material between a punch element on one side thereof and a strike surface on another side thereof wherein said punch element has male features configured in the shape of the breakaway port section;
squeezing a portion of said material between a punch element and a strike surface whereby said material is forged around the male features thereby to form lines of reduced thickness partible by mechanical force exerted thereon; and
allowing said material to cool.

2. The method according to claim 1 wherein said production piece is fabricated as a container lid and including the step of molding a lid edge structure around said breakaway port section concurrently with the step of squeezing the portion of said material between said punch element and said strike surface.

3. The method according to claim 2 including the step of trimming said container lid from said sheet of material after the step of allowing said material to cool.

4. The method according to claim 1 wherein the step of squeezing the portion of said material is accomplished by advancing said strike surface toward said punch element.

5. The method according to claim 4 wherein said strike surface is provided by a strike element having a strike head containing the strike surface, and including the step of resiliently biasing said strike head with a biasing force directed toward said punch element whereby the step of advancing said strike surface toward said punch element first causes said strike head to contact the portion of said material, the step of squeezing the portion of material being accomplished by said biasing force upon further advancement of said strike head toward said punch element.

6. Apparatus operative to thermoform a breakaway port section in a piece to be molded wherein said piece to be molded has a first thickness, said breakaway portion section normally maintaining the integrity of the piece against passage of fluids yet which is partible under mechanical pressure thereby to form a port for the passage of fluids therethrough, comprising:

oven means for heating said piece to a preselected elevated temperature so that said piece is in a plastic state;
a punch element having a punch surface formed with male features defining a profile for said breakaway port section;
a striker assembly associated with said punch element, said striker assembly including a strike head mounted so that said piece may be located between said punch surface and said strike head; and
force applying means for relatively forcing said strike head and said punch element against a portion of said piece on opposite sides thereof with a striking force so that said portion is squeezed between said strike head and said punch element to forge said portion against the male features of said punch element thereby forming said breakaway port section in the configuration of said male features.

7. Apparatus according to claim 6 including means for adjusting the magnitude of the striking force.

8. Apparatus according to claim 6 including means for moving said punch element and said strike head toward one another into a closed position and away from one another in an open position, said force applying means including a biasing spring having a restorative force operative to resiliently bias said strike head toward said punch element, said strike head and said punch element positioned such that said strike head and said punch element contact said portion of said piece before said punch element and said strike head mold reach the closed position whereby further movement toward the closed position compresses said biasing spring with the restorative force thereby providing the striking force.

9. Apparatus according to claim 8 including means for adjustably pre-compressing said biasing spring thereby to vary the magnitude of the striking force.

10. Apparatus according to claim 6 including at least one upstanding rib on the punch surface to define said male features, said rib having a triangular cross-section with a base thereof contiguous with the punch surface and a pair of sides converging upwardly from the punch surface to define the height of the male features.

11. Apparatus according to claim 10 wherein said sides converge at a large acute angle with respect to one another.

12. Apparatus according to claim 11 wherein said large acute angle is in the range of 80 degrees to 90 degrees, inclusively.

13. Apparatus according to claim 10 wherein said rib is truncated at a apex portion thereof to form a flat apexial surface.

14. Apparatus according to claim 13 wherein said apexial surface is substantially parallel to said punch surface and has a width that is less than the height of said rib.

15. Apparatus according to claim 14 wherein the height of said rib is approximately 0.008 inches and the width of said apexial surface is approximately 0.005 inches.

16. Apparatus according to claim 10 including a plurality of linear ribs intersecting one another at a common center so that said breakaway port section is formed by a plurality of triangular panels.

17. Apparatus according to claim 16 wherein there are two said ribs intersecting one another at right angles.

18. Apparatus according to claim 17 wherein there are three said ribs intersecting one another at 60 degree angles.

19. Apparatus according to claim 10 wherein said rib has a C-shaped profile.

20. Apparatus according to claim 6 wherein a plurality of pieces are molded out of a sheet of material and including a pressure molding means for forming said pieces, said molding means including a mold assembly and a pressure box assembly relatively movable with respect to one another between a mold open position and a mold closed position creating a mold chamber, said mold assembly having a mold element providing a mold shape for the piece to be formed, pressurizing means for selectively pressurizing the mold chamber to cause said sheet to take the shape of said mold element, means for moving said mold assembly and said pressure box assembly into and out of the closed position, and means for advancing said sheet through said oven means and said pressure molding means.

21. Apparatus according to claim 15 wherein said striker assembly is associated with said pressure box assembly, said strike head being spring biased by a spring element whereby, when said mold assembly and said pressure box assembly move toward the closed position, said strike head contacts said piece so that said spring element applies the striking force.

22. Apparatus operative to thermoform pieces from a material blank which has a first thickness whereby each said piece has a breakaway port section normally maintaining the integrity of the piece against passage of fluids therethrough yet partible under mechanical pressure thereby to form a port for the passage of fluids therethrough, comprising:
    oven means for heating said material blank to a preselected elevated temperature so that said material blank is in a plastic state;
    a pressure molding means for forming said pieces, said molding means including a mold assembly and a pressure box assembly relatively movable with respect to one another between a mold open position and a mold closed position creating a mold chamber, said mold assembly having a mold element with a flat surface bounded by lid edge forming features, and including pressurizing means selectively pressurizing the mold chamber to cause said material blank to take the shape of said mold element;
    means for advancing said material blank through said oven means and said pressure molding means;
    a punch element associated with said pressure molding means, said punch element having a punch surface formed with male features projecting above said flat surface of said mold element and defining a profile for said breakaway port section; and
    a striker assembly associated with said pressure molding means, said striker assembly including a strike plate mounted so that said material blank is located between said punch surface and said strike plate, said striker assembly including force applying means for pressing said strike plate against a portion of said material blank to force said portion against the male features of said punch element thereby to forge said breakaway port section in the configuration of said male features.

23. Apparatus according to claim 13 including trim means for cutting said piece from said material blank.

24. Apparatus according to claim 23 wherein said material blank is in the form of a relatively continuous sheet of material, said mean for advancing operative to advance said sheet in increments through said oven means and said pressure molding means whereby said pressure molding means may be periodically operated to sequentially form a plurality of pieces in said sheet, said trim means operative to consecutively cut said pieces from said sheet.

25. Apparatus according to claim 22 including means for adjusting the magnitude of the striking force.

26. Apparatus according to claim 22 wherein said force applying means includes a biasing spring having a restorative force operative to resiliently bias said strike head toward said punch element, said strike head and said punch element positioned such that said strike head and said punch element contact said portion of said piece before said punch element and said strike head mold reach the closed position whereby further movement toward the closed position compresses said biasing spring with the restorative force thereby providing the striking force.

27. Apparatus according to claim 26 including means for adjustably pre-compressing said biasing spring thereby to vary the magnitude of the striking force.

28. Apparatus according to claim 22 including at least one upstanding rib on the punch surface to define said male features, said rib having a triangular cross-section with a base thereof contiguous with the punch surface and a pair of sides converging upwardly from the punch surface to define the height of the male features.

29. Apparatus according to claim 28 wherein said sides converge at a large acute angle with respect to one another.

30. Apparatus according to claim 28 wherein said rib is truncated at a apex portion thereof to form a flat apexial surface.

31. Apparatus according to claim 22 wherein said apexial surface is substantially parallel to said punch surface and has a width that is less than the height of said rib.

32. Apparatus according to claim 28 including a plurality of linear ribs intersecting one another at a common center so that said breakaway port section is formed by a plurality of triangular panels.

33. Apparatus according to claim 28 wherein said rib has a C-shaped profile.

34. In a thermoforming apparatus operative to thermoform plastic pieces out of a heated plastic material blank, said apparatus including an oven assembly operative to pre-heat the material blank to a preselected temperature, a pressure molding assembly operative to form said plastic pieces and means for advancing said plastic blank through said oven assembly, said pressure molding assembly including a mold section and a pressure box section relatively movable between a mold open position and a mold closed position whereby said mold and pressure box sections define a mold chamber when in the mold closed position and including a mold element having a mold configuration of the piece to be formed, said pressure molding assembly including pressurizing means associated therewith for selectively pressurizing the mold chamber to cause said material blank to take the shape of said mold element, an improvement comprising a forging assembly associated with said pressure molding assembly and operative to form a breakaway port section in said piece, said forging assembly including a punch element located on a first side of said material blank and striker means located on a second side of said material blank when the material blank is in the mold chamber, said striker means including a strike head and force applying means for applying a striking force said force applying means including a biasing spring having a restorative force operative to resiliently bias said strike head toward said punch element such that compressing said biasing spring provides with a striking force to a portion of said material blank so that said portion is forced against a male profile on said punch element thereby forming said port section.

35. The improvement according to claim 34 wherein said striker means includes a striker element having a strike head mounted for movement toward said punch element when said mold and pressure box sections move toward the mold closed position and including force applying means for causing said strike head to apply the striking force whereby said portion of said material blank is trapped between said punch element and said striker element with said strike head attacking said portion.

36. The improvement according to claim 35 including means for adjusting the magnitude of the striking force.

37. The improvement according to claim 35 wherein said force applying means includes a biasing spring having a restorative force operative to resiliently bias said strike head toward said punch element, said strike head and said punch element positioned such that said strike head and said punch element contact said portion of said blank material before said mold and pressure box sections reach the mold closed position whereby further movement toward the closed position compresses said biasing spring with the restorative force thereby providing the striking force.

38. The improvement according to claim 33 including means for adjustably pre-compressing said biasing spring thereby to vary the magnitude of the striking force.

* * * * *